United States Patent
Hu

(10) Patent No.: US 8,049,473 B2
(45) Date of Patent: Nov. 1, 2011

(54) POWER SUPPLY CIRCUIT

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 383 days.

(21) Appl. No.: 12/429,148

(22) Filed: Apr. 23, 2009

(65) Prior Publication Data

US 2010/0264889 A1      Oct. 21, 2010

(30) Foreign Application Priority Data

Apr. 21, 2009   (CN) .......................... 2009 1 0301703

(51) Int. Cl.
    *G05F 1/59* (2006.01)
(52) U.S. Cl. ...................... 323/271; 323/284
(58) Field of Classification Search .................. 323/271, 323/282, 284

See application file for complete search history.

(56) References Cited

U.S. PATENT DOCUMENTS

| 7,629,778 | B2 * | 12/2009 | Liu ................................ 323/222 |
| 7,737,672 | B2 * | 6/2010 | Kudo ............................. 323/284 |
| 7,884,590 | B2 * | 2/2011 | Liu ................................ 323/282 |
| 7,898,236 | B2 * | 3/2011 | Houston et al. ............... 323/284 |
| 2008/0012542 | A1 * | 1/2008 | Liu et al. ....................... 323/271 |
| 2009/0153110 | A1 * | 6/2009 | Huang ........................... 323/271 |
| 2010/0264889 | A1 * | 10/2010 | Hu ................................. 323/282 |

* cited by examiner

*Primary Examiner* — Jeffrey Sterrett
(74) *Attorney, Agent, or Firm* — Altis Law Group, Inc.

(57) ABSTRACT

A power supply circuit includes a pulse width modulation (PWM) signal generator, a current adjustment unit, a drive unit, and a feedback unit. The PWM signal generator outputs a PWM voltage signal to the drive unit. The drive unit outputs a first control signal to control the current adjustment unit to work, and outputs a first direct current signal and a direct voltage signal. The current adjustment unit outputs a second direct current signal. A working current of the electrical device comes from the first and second direct current signals. The feedback unit generates a feedback voltage signal according to the direct voltage signal, and transmits the feedback voltage signal to the PWM signal generator to adjust the PWM voltage signal.

13 Claims, 2 Drawing Sheets

POWER SUPPLY CIRCUIT

BACKGROUND

1. Technical Field

The present disclosure relates to power supply circuits, and particularly to a power supply circuit for supplying a direct current (DC) current to an electrical device.

2. Description of the Related Art

Generally, an output current of a power supply circuit will increase to meet load demand. However, if the output current becomes too great, a drive unit in the power supply circuit may be destroyed. However, popular power supply circuits cannot ensure the security of the drive unit and the current requirement of a load at the same time.

DETAILED DESCRIPTION

Figure 1:
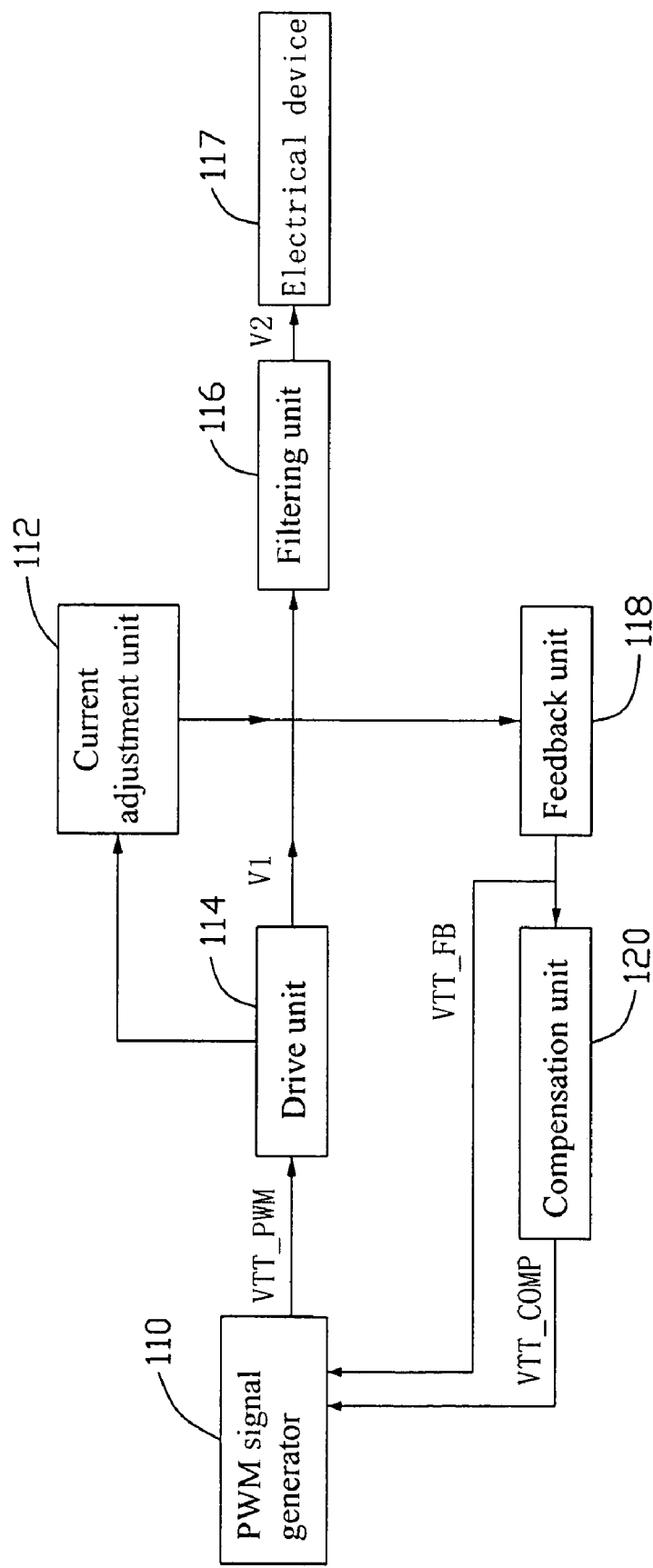
FIG. 1 is a block diagram of an exemplary embodiment of a power supply circuit.

Referring to FIG. 1, an exemplary embodiment of a power supply circuit is used for supplying DC current signals and DC voltage signals to an electrical device 117. The power supply circuit includes a pulse width modulation (PWM) signal generator 110, a current adjustment unit 112, a drive unit 114, a filtering unit 116, a feedback unit 118, and a compensation unit 120. The PWM signal generator 110 is used for outputting a PWM voltage signal VTT_PWM to the drive unit 114. The current adjustment unit 112 is used for outputting at least one DC current signal. The drive unit 114 is used for outputting at least one control signal, to control the current adjustment unit 112 to work. The drive unit 114 is further used for outputting a DC current signal and a DC voltage signal V1. A working current of the electrical device 117 comes from the DC current signals from the current adjustment unit 112 and the drive unit 114. The filtering unit 116 is used for filtering noise from the DC voltage signal V1 to generate a filtered DC voltage signal V2, and outputting the filtered DC voltage signal V2 to the electrical device 117.

The feedback unit 118 is used for generating a feedback voltage signal VTT_FB based on the DC voltage signal V1, and transmitting the feedback voltage signal VTT_FB to the PWM signal generator 110. The PWM signal generator 110 adjusts the PWM voltage signal VTT_PWM by comparing the feedback voltage signal VTT_FB with a first preset value stored in the PWM signal generator 110. When the feedback voltage signal VTT_FB is less than the first preset voltage value, the PWM signal generator 110 increases the PWM voltage signal VTT_PWM. Otherwise, when the feedback voltage signal VTT_FB is greater than the first preset voltage value, the PWM signal generator 110 reduces the PWM voltage signal VTT_PWM.

The compensation unit 120 is used for generating a compensation voltage signal VTT_COMP based on the feedback voltage signal VTT_FB, and outputting the compensation voltage signal VTT_COMP to the PWM signal generator 110. The PWM signal generator 110 adjusts the PWM voltage signal VTT_PWM according to comparing the compensation voltage signal VTT_COMP with a second preset voltage value stored in the PWM signal generator 110. When the compensation voltage signal VTT_COMP is less than the second preset voltage value, the PWM signal generator 110 increases the PWM voltage signal VTT_PWM. Otherwise, when the compensation voltage signal VTT_COMP is greater than the second preset voltage value, the PWM signal generator 110 reduces the PWM voltage signal VTT_PWM.

The feedback voltage signal VTT_FB is a major factor to adjust the PWM voltage signal VTT_PWM. The compensation unit 120 is only an accessory unit, and can be omitted depending on the embodiment. Additionally, the filter unit 116 is only used for filtering noise from the DC voltage signal V1, and can also be omitted depending on the embodiment.

Figure 2:
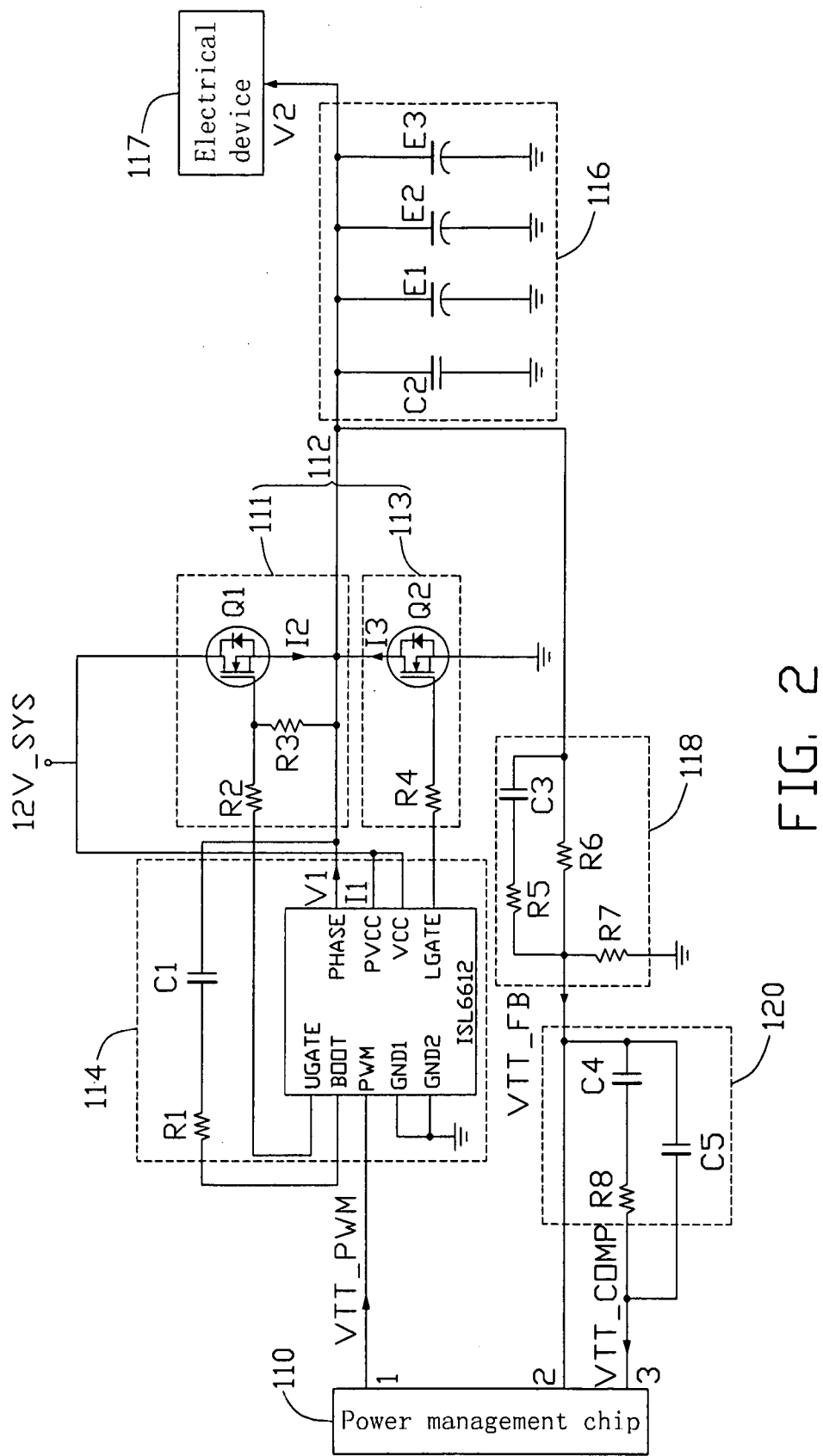
FIG. 2 is an exemplary embodiment of a circuit diagram of the power supply circuit in FIG. 1.

Referring to FIG. 2, the current adjustment unit 112 includes a first switch circuit 111 and a second switch circuit 113. The PWM signal generator 110 can be a power management chip having an output pin 1, and two input pins 2 and 3. The output pin 1 is used for outputting the PWM voltage signal VTT_PWM. The input pins 2 and 3 are used for receiving the feedback voltage signal VTT_FB and the compensation voltage signal VTT_COMP, respectively.

The drive unit 114 includes a high frequency metal oxide semiconductor field effect transistor (MOSFET) driver, a first resistor R1, and a first capacitor C1. In one embodiment, the high frequency MOSFET driver is an ISL6612 chip having an UGATE pin, a BOOT pin, a PWM pin, a PHASE pin, a GND1 pin, a GND2 pin, a PVCC pin, a VCC pin, and a LGATE pin. The UGATE pin is connected to the first switch circuit 111. The BOOT pin is connected to a positive terminal of the first capacitor C1 through the first resistor R1. A negative terminal of the first capacitor is C1 is connected to the PHASE pin. The PHASE pin is used for outputting the DC voltage signal V1 and a first DC current signal I1. The PWM pin is connected the output pin 1 of the power management chip for receiving the PWM voltage signal VTT_PWM. The GND1 and GND2 pins are grounded. The PVCC and VCC pins are connected a DC power supply, such as a 12-volt system power supply 12V-SYS. The LGATE pin is connected to the second switch circuit 113.

The first switch circuit 111 includes a second resistor R2, a third resistor R3, and a first field effect transistor (FET) Q1. The gate of the first FET Q1 is connected to the UGATE pin and the PHASE pin through the second and third resistors R2 and R3 respectively. The drain of the first FET Q1 is connected to the DC power supply. The source of the first FET Q1 is connected to the PHASE pin. The second switch circuit 113 includes a fourth resistor R4, and a second FET Q2. The gate of the second FET Q2 is connected to the LGATE pin through the fourth resistor R4. The source of the second FET Q2 is grounded. The drain of the second FET Q2 is connected to the PHASE pin. The types of the first and second FETs Q1 and Q2 are AOD452 and AOD472 respectively, wherein the maximum and minimum values of the rated voltage for AOD452 and AOD472 are 25V and −8V respectively.

The filtering unit 116 includes a second capacitor C2, a first electrolytic capacitor E1, a second electrolytic capacitor E2, and a third electrolytic capacitor E3. Positive terminals of the second capacitor C2, the first electrolytic capacitor E1, the second capacitor E2, and the third electrolytic capacitor E3 are connected to the PHASE pin to receive the DC voltage signal V1. Negative terminals of the second capacitor C2, the first electrolytic capacitor E1, the second capacitor E2, and the third electrolytic capacitor E3 are grounded.

The feedback unit 118 includes a third capacitor C3, a fifth resistor R5, a sixth resistor R6, and a seventh resistor R7. A negative terminal of the third capacitor C3 is connected to the PHASE pin to receive the DC voltage signal V1. A positive terminal of the third capacitor C3 is connected to a first terminal of the fifth resistor R5. A second terminal of the fifth resistor R5 is grounded through the seventh resistor R7, and outputs the feedback voltage signal VTT_FB. The sixth resistor R6 is connected between a negative terminal of the fifth capacitor C5 and the second terminal of the fifth resistor R5.

The compensation unit 120 includes an eighth resistor R8, a fourth capacitor C4, and a fifth capacitor C5. Negative terminals of the fourth and fifth capacitors C4, C5 are connected to the second terminal of the fifth resistor R5 to receive the feedback voltage signal VTT_FB. A positive terminal of the fourth capacitor C4 is connected to a first terminal of the eighth resistor R8. A second terminal of the eighth resistor R8 is connected to a positive terminal of the fifth capacitor C5, and outputs the compensation voltage signal VTT_COMP.

The output pin 1 of the PWM signal generator 110 outputs the PWM voltage signal VTT_PWM to the PWM pin of the ISL6612 chip. The UGATE pin and the LGATE pin alternately output a first control signal and a second control signal. When the UGATE pin outputs the first control signal to the gate of the first FET Q1, the first FET Q1 turns on, and outputs a DC current signal I2. When the LGATE pin outputs the second control signal to the gate of the second FET Q2, the second FET Q2 turns on, and outputs a DC current signal I3. The working current of the electrical device 117 comes from the DC current signals I1, I2, and I3.

The filtering unit 116 filters the DC voltage signal V1 to generate the filtered DC voltage signal V2, and transmits the filtered DC voltage signal V2 to the electrical device 17. The feedback unit 118 generates the feedback voltage signal VTT_FB based on the DC voltage signal V1, and transmits the feedback voltage signal VTT_FB to the input pin 2 of the power management chip. The compensation unit 120 generates the compensation voltage signal VTT_COMP based on the feedback signal VTT_FB, and transmits the compensation voltage signal VTT_COMP to the input pin 3 of the power management chip.

When the above-described electrical elements have reference values as following, the first and second FETs Q1 and Q2 can work in rated voltage ranges. A capacitance of the first capacitor ranges from about 0.08 uF to about 0.18 uF. Capacitances of the second, third, fourth, and fifth capacitors are about 4.7 uF, 47 nF, 10 nF, and 68 nF respectively. Capacitances of the first, second, and third electrolytic capacitors ranges from about 800 uF to about 1200 uF; and a resistance of the first resistor ranges from about 10.45 k$\Omega$ to about 11.55 k$\Omega$. A resistance of the second resistor ranges from about 4.47 k$\Omega$ to about 4.93 k$\Omega$. A resistance of the third resistor ranges from about 9.9 k$\Omega$ to about 10.1 k$\Omega$. A resistance of the fourth resistor ranges from about 0$\Omega$ to about 0.05$\Omega$. A resistance of the fifth resistor ranges from about 31.35$\Omega$ to about 34.65$\Omega$; and a resistance of the sixth resistor ranges from about 2.178 k$\Omega$ to about 2.222 k$\Omega$. A resistance of the seventh resistor ranges from about 3.831 k$\Omega$ to about 3.939 k$\Omega$. A resistance of the eighth resistor ranges from about 10.45 k$\Omega$ to about 11.55 k$\Omega$. Therefore, the first switch unit 111 and the second switch unit 113 can alternatively supply the DC current signals I2 and I3 to the electrical device 117. The disclosure can ensure the security of the drive unit 114 and the current requirement of the electrical device 117 at the same time. It should be understood that reference values of the above-described electrical elements can be adjusted to achieve the purpose of the disclosure.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A power supply circuit for supplying power for an electrical device, the power supply circuit comprising:
    a pulse width modulation (PWM) signal generator to output a PWM voltage signal;
    a current adjustment unit to output at least one direct current (DC) current signal;
    a drive unit to receive the PWM voltage signal, output at least one control signal to control the current adjustment unit to work, and output a first DC current signal and a DC voltage signal according to the PWM voltage signal, wherein a working current of the electrical device comes from the first DC current signal and the at least one DC current signal; and
    a feedback unit to generate a feedback voltage signal according to the DC voltage signal, and transmit the feedback voltage signal to the PWM signal generator, wherein the PWM signal generator adjusts the PWM voltage signal by comparing the feedback voltage signal with a first preset voltage value.

2. The power supply circuit of claim 1, wherein the PWM signal generator increases the PWM voltage signal in response to the feedback voltage signal being less than the first preset voltage value, and wherein the PWM signal generator reduces the PWM voltage signal in response to the feedback voltage signal being greater than the first preset voltage value.

3. The power supply circuit of claim 1, further comprising a filtering unit, wherein the filtering unit filters the DC voltage signal to generate a filtered DC voltage signal, and outputs the filtered DC voltage signal to the electrical device.

4. The power supply circuit of claim 3, still further comprising a compensation unit, wherein the compensation generates a compensation voltage signal based on the feedback voltage signal, and outputs the compensation voltage signal to the PWM signal generator, wherein the PWM signal generator adjusts the PWM voltage signal by comparing the compensation voltage signal and a second preset voltage value, wherein the PWM signal generator increases the PWM voltage signal in response to the compensation voltage signal being less than the second preset voltage value, and wherein the PWM signal generator reduces the PWM voltage signal in response to the compensation voltage signal being greater than the second preset voltage value.

5. The power supply circuit of claim 4, wherein the PWM signal generator is a power management chip, the power management chip comprises a first pin, a second pin, and a third pin, wherein the first pin outputs the PWM voltage signal, and wherein the second and third pins receive the feedback voltage signal and the compensation voltage signal respectively.

6. The power supply circuit of claim 5, wherein the current adjustment unit comprises a first switch circuit and a second switch circuit; the drive unit alternately outputs a first control signal and a second control signal to control the first and second switch circuits respectively, wherein the first and second switch circuits output a second DC current signal and a third DC current signal respectively.

7. The power supply circuit of claim 6, wherein the drive unit comprises a high frequency metal oxide semiconductor field effect transistor (MOSFET) driver, a first resistor, and a first capacitor, wherein the high frequency MOSFET driver comprises an UGATE pin, a BOOT pin, a PWM pin, a PHASE pin, a GND1 pin, a GND2 pin, a PVCC pin, a VCC pin, and a LGATE pin, wherein the UGATE pin is connected to the first switch circuit to output the first control signal to the first switch circuit; the BOOT pin is connect to a positive terminal of the first capacitor through the first resistor; a negative terminal of the first capacitor is connected to the PHASE pin; the PWM pin is connected to the first pin of the power management chip to receive the PWM voltage signal; the GND1 and GND2 pins are grounded; the PHASE pin is connected to the current adjustment unit to output the first DC current signal and the DC voltage signal; the PVCC and VCC pins are connected a DC power supply; and the LGATE pin is connected to the second switch circuit to output the second control signal to the second switch circuit.

8. The power supply circuit of claim 7, wherein the first switch circuit comprises a second resistor, a third resistor, and a first field effect transistor (FET), wherein a gate of the first FET is connected to the UGATE pin through the second resistor to receive the first control signal, and is connected to the PHASE pin through the third resistor; wherein a drain of the first FET is connected to the DC power supply, and a source of the first FET is connected to the PHASE pin to output the second DC current signal; the second switch circuit comprises a fourth resistor and a second FET, wherein a gate of the second FET is connected to the LGATE pin through the fourth resistor to receive the second control signal, wherein a source of the second FET is grounded, and a drain of the second FET is connected to the PHASE pin to output the third DC current signal.

9. The power supply circuit of claim 8, wherein the filtering unit comprises a second capacitor, a first electrolytic capacitor, a second electrolytic capacitor, and a third electrolytic capacitor, wherein positive terminals of the second capacitor, the first, second, and third electrolytic capacitors are connected to the drive unit to receive the DC voltage signal; negative terminals of the second capacitor, the first, second, and third electrolytic capacitors are grounded.

10. The power supply circuit of claim 9, wherein the feedback circuit comprises a third capacitor, a fifth resistor, a sixth resistor, and a seventh resistor, wherein a negative terminal of the third capacitor is connected to the drive unit to receive the DC voltage signal; a positive terminal of the third capacitor is connected to a first terminal of the fifth resistor; the sixth resistor is connected between the negative terminal of the third capacitor and the second terminal of the fifth resistor; a second terminal of the fifth resistor is grounded through the seventh resistor, and outputs the feedback voltage signal.

11. The power supply circuit of claim 10, wherein the compensation unit comprises an eighth resistor, a fourth capacitor, and a fifth capacitor; wherein negative terminals of the fourth and fifth capacitors are connected to the second terminal of the fifth resistor to receive the feedback voltage signal; a positive terminal the fourth capacitor is connected to a first terminal of the eighth resistor; a second terminal of the eighth resistor is connected to a positive terminal of the fifth capacitor, and outputs the compensation voltage signal.

12. The power supply circuit of claim 11, wherein a capacitance of the first capacitor ranges from about 0.08 uF to about 0.18 uF; capacitances of the second, third, fourth, and fifth capacitors are about 4.7 uF, 47 nF, 10 nF, and 68 nF respectively; capacitances of the first, second, and third electrolytic capacitors range from about 800 uF to about 1200 uF; a resistance of the first resistor ranges from about 10.45 kΩ to about 11.55 kΩ; a resistance of the second resistor ranges from about 4.47 kΩ to about 4.93 kΩ; a resistance of the third resistor ranges from about 9.9 kΩ to about 10.1 kΩ; a resistance of the fourth resistor ranges from about 0Ω to about 0.05Ω; a resistance of the fifth resistor ranges from about 31.35Ω to about 34.65Ω; a resistance of the sixth resistor ranges from about 2.178 kΩ to about 2.222 kΩ; a resistance of the seventh resistor ranges from about 3.831 kΩ to about 3.939 kΩ; a resistance of the eighth resistor ranges from about 10.45 kΩ to about 11.55 kΩ.

13. The power supply circuit of claim 9, wherein the first and second FETs are AOD452 and AOD472 FETs respectively.

* * * * *